United States Patent [19]

Morris

[11] Patent Number: 4,972,186

[45] Date of Patent: Nov. 20, 1990

[54] RESOLVER EXCITATION CIRCUIT

[75] Inventor: David J. Morris, Mayfield Heights, Ohio

[73] Assignee: Allen-Bradley Company, Inc., Milwaukee, Wis.

[21] Appl. No.: 325,687

[22] Filed: Mar. 20, 1989

[51] Int. Cl.$^5$ .................... G08C 19/16; G05B 19/31
[52] U.S. Cl. ................... 340/870.250; 318/661; 318/605; 340/870.370
[58] Field of Search ............. 340/870.25, 870.37; 364/721, 729, 603, 817; 318/661, 605; 324/167; 341/114, 115, 116, 117

[56] References Cited

U.S. PATENT DOCUMENTS

| | | | |
|---|---|---|---|
| 3,918,044 | 11/1975 | Alpatoff et al. | 341/115 |
| 4,021,714 | 5/1977 | Jones et al. | 318/661 |
| 4,070,665 | 1/1978 | Glennon et al. | 341/115 |
| 4,204,257 | 5/1980 | Hungerford | 364/474.37 |
| 4,268,786 | 5/1981 | Rohrle | 318/661 |
| 4,310,790 | 1/1982 | Mulet-Marquis | 318/608 |
| 4,335,443 | 6/1982 | Dickey | 364/815 |
| 4,449,117 | 5/1984 | Fortescue | 318/661 |
| 4,472,669 | 9/1984 | Denham et al. | 318/661 |
| 4,475,105 | 10/1984 | Kurosawa | 340/870.25 |
| 4,556,885 | 12/1985 | Kurosawa | 340/870.25 |
| 4,635,279 | 1/1987 | Nossen | 364/721 |
| 4,712,106 | 12/1987 | McNally | 318/661 |
| 4,795,954 | 1/1989 | Sakurai et al. | 318/661 |

*Primary Examiner*—Donald J. Yusko
*Assistant Examiner*—Yuk H. Lau
*Attorney, Agent, or Firm*—Quarles & Brady

[57] ABSTRACT

A resolver driver circuit uses sine and cosine values stored in a read only memory to generate sine and cosine waveforms by sequentially reading the stored values and passing them through a clocked data latch to a digital-to-analog converter. The output of the digital-to-analog converter is filtered to remove quantization error. Phase error produced by the filtering and other sources is detected by timing the zero crossings of the sine and cosine waveforms and comparing them to a master synchronization signal. Phase error is corrected by controlling the timing of the latch which passes data to the digital-to-analog converter.

5 Claims, 6 Drawing Sheets

PHASE MAINTENANCE CIRCUIT

AMPLITUDE
MAINTENANCE
CIRCUIT

RESOLVER EXCITATION CIRCUIT

BACKGROUND OF THE INVENTION

1. Field of the Invention

The field of the invention is resolver excitation circuits and more particularly methods of precisely synchronizing the phase of a cosine and sine wave to digital reference signal.

2. Description of the Prior Art

Resolvers are used to provide an electrical measure of angular position or related quantities such as velocity or acceleration. A resolver is similar in construction to a motor, containing a stationary set of two perpendicularly oriented stator coils and a rotatable rotor coil. When the stator coils are excited by properly phased sinusoidal signals, the rotor coil generates a sine wave signal whose phase, with respect to the stator signals, is directly related to the rotor's angular position within the stator. If the phase of the stator signals is known, the angular position of the rotor may be derived from the phase of the rotor's signal.

The accuracy of the waveforms used to excite the stator of the resolver affects the accuracy of the resolver's operation. Typically the two coils of the resolver's stator are excited by sinusoidal waveforms with a 90° phase difference: i.e. a sine and cosine signal. If the sine and cosine signals are of constant frequency, exactly 90° in phase difference, of equal amplitude, and of low distortion, then the phase of the sinusoidal rotor signal will accurately reflect the rotor's angular position. Phase or amplitude variation in the exciting sine and cosine signals or distortion in their waveform shapes will decrease the resolver's accuracy.

The generation of pure sinusoidal signals with precise frequency and phase relationships is extremely difficult with analog circuitry. Accordingly, digital synthesis techniques are typically used for the generation of resolver excitation signals. Such digital synthesis techniques store the values of the waveform to be synthesized, over a full waveform cycle, in a digital memory "look-up table". The look up table is read sequentially at a high rate into a digital-to-analog converter ("DAC") which produces a "staircase" approximation of the desired waveform. This staircase waveform is then typically filtered, by a low-pass filter network, to remove the staircase "distortion" and to produce a pure sine or cosine wave.

Unfortunately, the low-pass filter network can introduce significant phase and amplitude error into the digitally synthesized sine and cosine signals. These errors result both from phase "lag" or "lead" intrinsic to the filtering process and from drift of the values of the analog components of the filter network and from variation within each component's tolerance.

SUMMARY OF THE INVENTION

The present resolver excitation circuit synthesizes a sinusoidal excitation signal that is accurately synchronized with the phase of a digital timing reference signal.

A memory stores words representing digitized values of a portion of one period of a sine or cosine wave sufficient to reconstruct a continuous sine or cosine wave. These words are output from the memory by an address counter.

A latch receives each word of waveform data from the memory, storing one word of waveform data at one time. This data is transferred to a digital-to-analog converter and converted to an analog signal that controls the sinusoidal excitation signal.

A phase difference detection circuit produces a signal indicating the difference in phase between the sinusoidal excitation signal and the digital timing reference signal. This phase difference signal controls the timing of the output of each word of waveform data from the latch to the digital-to-analog converter thereby adjusting the phase of the analog signal that controls the sinusoidal excitation signal. In this manner, the sinusoidal excitation signal is brought into a predefined phase relationship with the digital timing reference signal.

It is a specific object of the invention to correct the phase of a sinusoidal excitation signal with respect to a digital timing reference signal.

It is a general object of the invention to produce two sinusoidal excitation signals that are of 90° phase difference. Each sinusoidal excitation waveform is corrected relative to the digital timing reference signal and hence are corrected with respect to each other.

A further object of the invention is to permit the generation of highly accurate 90° phased sine and cosine waveforms without the use of high tolerance components or manual calibration and adjustments The critical elements of the phase maintenance circuitry are digital and hence are more stable than phase maintenance circuitry using predominantly analog techniques.

Another object of the invention is to provide resolver excitation signals with amplitude unaffected by phase correction. Delaying or advancing the time at which the waveform data in the look-up table is presented to the DAC controls the phase of the resultant waveform without affecting the waveform's amplitude.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 6:
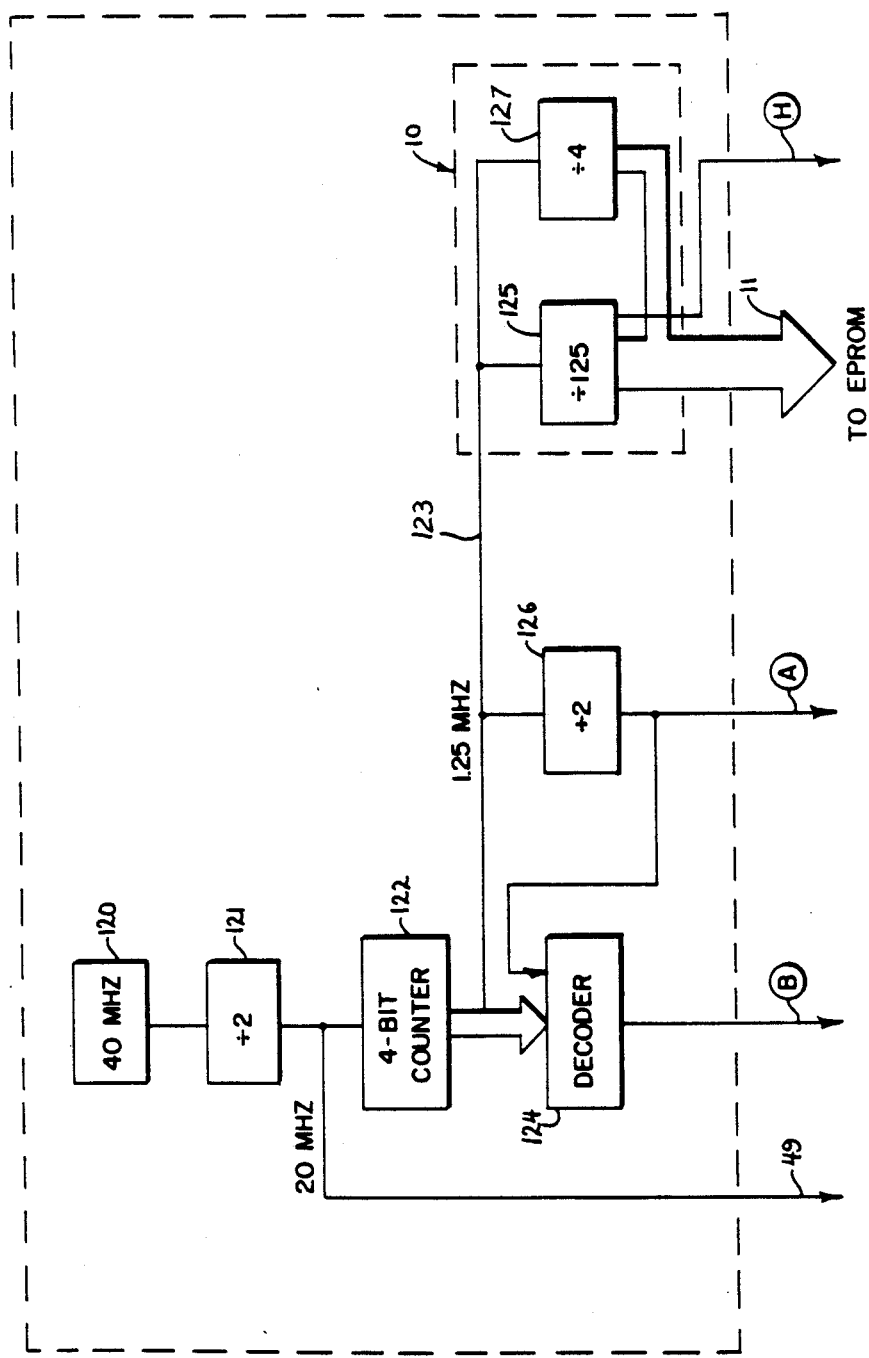
FIG. 6 is block diagram of the timing circuitry of the circuit of FIG. 1.

Referring to FIG. 6, a 9-bit binary address counter 10 counts a 1.25 Mhz clock signal 123. The 1.25 Mhz clock signal 123 is derived from a master 40 Mhz crystal oscillator 120 that has been scaled down in frequency by a factor of 32 by a successive application of a divide-by-two counter 121 and a binary 4-bit counter 122.

The 9-bit address counter 10 is constructed of a divide-by-125 counter 125 and a divide-by-4 counter 127 to be cyclically redundant after 500 clock pulses or at a fundamental frequency of 2.5 khz. The outputs of the counter are connected to the address inputs of an 8-bit erasable programmable read-only-memory (EPROM) 12, shown in FIG. 1. Accordingly, addresses 0 through 499 of the EPROM 12 are each read sequentially every 0.4 ms. Stored in the 250 even addresses of the EPROM 12 are sequential 8-bit words of sine waveform data representing 360° of angle argument i.e., one sine waveform "cycle". In the 250 odd addresses of EPROM 12 are 8-bit words of cosine waveform data similarly representing 360° of angle argument. The cosine words are equivalent to the sine words displaced by 90° of argument. Accordingly digitized words of a sine and cosine waveform appear in rapid succession at the output of EPROM 12. Although 8-bit words are described, it will be apparent to those skilled in the art that longer or shorter words may be used depending on the desired precision of the sine and cosine waveforms.

Demultiplexer 14 is connected to the output of EPROM 12 and triggered by the least significant bit (LSB) of 9-bit address counter 10, which indicates even or odd addresses as is understood in the art, to produce two 8-bit data streams one representing sequential words of sine waveform data values and one representing sequential words of cosine waveform data.

Figure 4A:
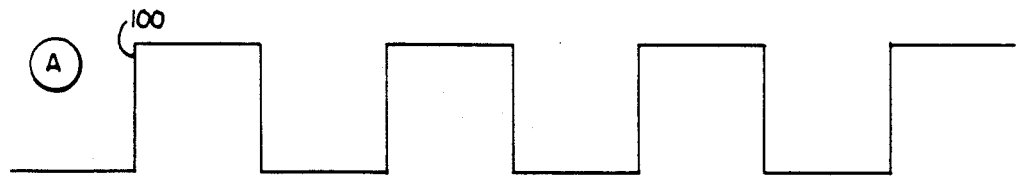
FIGS. 4(a)–4(f) are timing diagrams of signals used in the circuit of FIG. 1 under varying conditions of phase correction.

Referring again to FIG. 6, the 1.25 Mhz clock signal 123 is also connected to a divide-by-two counter 126 which produces a latching signal "A" which cause the first sine latch 16 and the first cosine latch 18 (shown in FIG. 1) to read and hold their respective sine and cosine data from multiplexer 14. Referring to FIG. 4(a), rising edge 100 of latching signal A initiates the latching of the sine or cosine data which is then held by the latches until the next rising edge of latching signal A.

For the sake of clarity, at this point on, only the circuitry and processing applicable to the cosine data will be described. Identical processing and circuitry is applied to the sine data from first sine latch 16 onward, with minor differences in timing, as will be apparent to one skilled in the art.

Figure 4B:
Figure 4C:
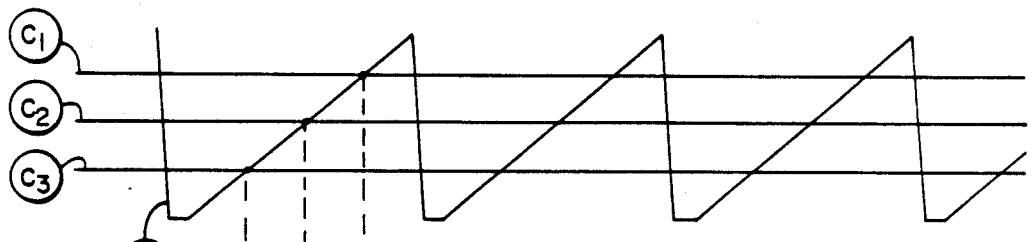
Figure 4D:
Figure 4E:
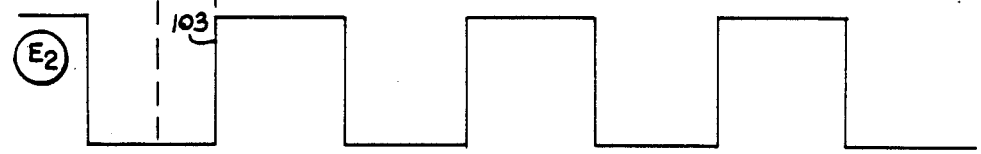
Figure 4F:
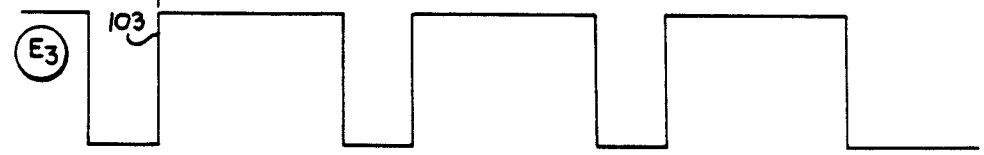

Referring again to FIG. 1, each word of cosine data in the first cosine latch 18 is passed to the output of the second cosine latch 22 upon the rising edge of signal E from phase control circuit 28 Referring to FIG. 4(d)-(f), the rising edge of signal E, 103, and hence the clocking of data by the second cosine latch 22, may be controlled by the phase control circuit 28 to occur at varying times after the clocking of data by the first cosine latch pair 18. The generation of signal E will be described in more detail below in connection with the detailed description of the phase maintenance circuit.

Figure 1:
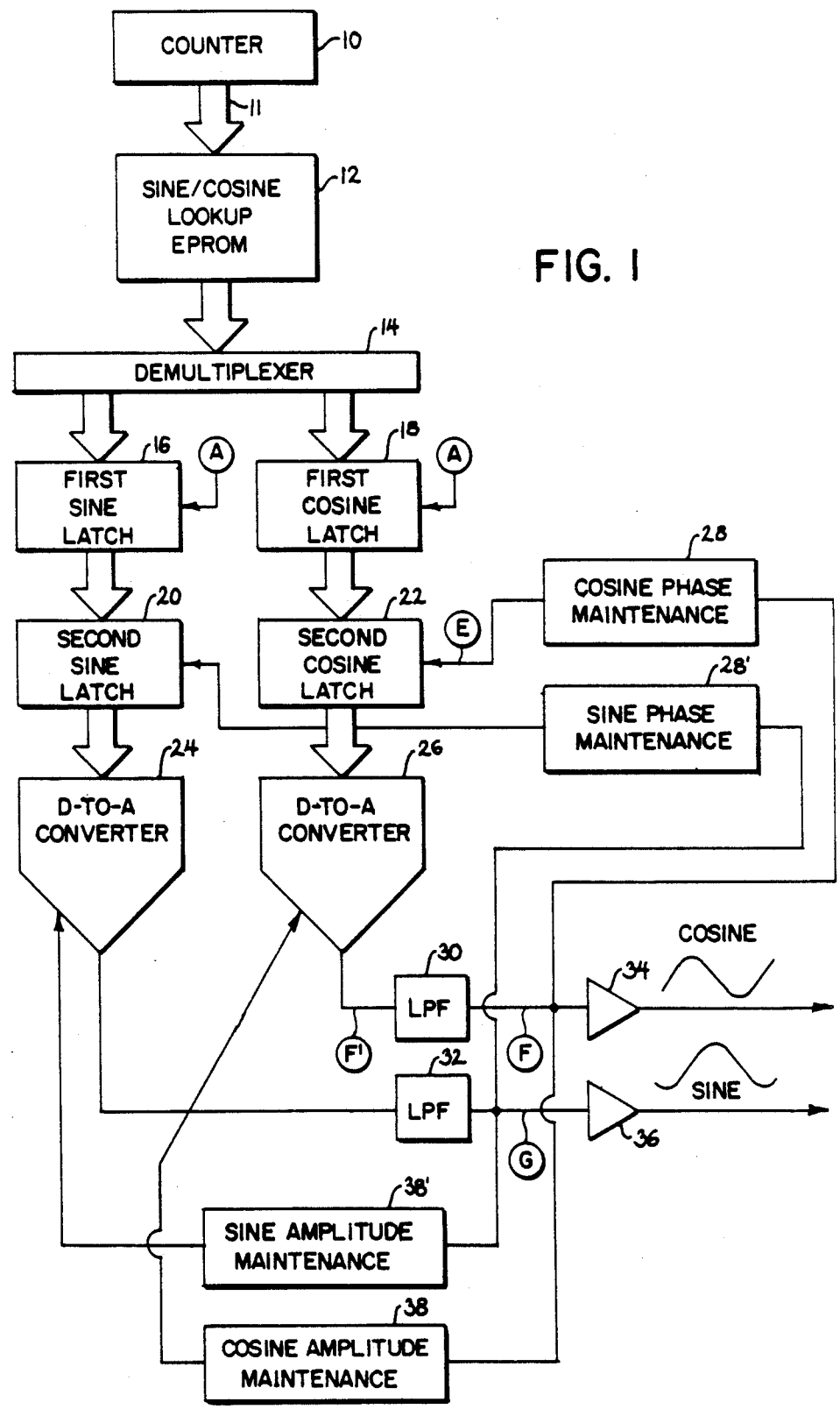
FIG. 1 is a block diagram of a resolver driver circuit according to the present invention.

Upon clocking of the word of cosine data by the second cosine latch 22, the data is immediately available to the DAC 26, shown in FIG. 1. Accordingly the rising edge of signal E controls the time of output of a word of cosine waveform data to the DAC and effectively initiates the conversion of the digital cosine data into a corresponding analog voltage.

This transfer of a word of cosine data from the EPROM 12 to the DAC 26 is repeated with each odd count of the 9-bit address counter 10, to occur once every 1.6 μs thereby producing a "staircase" 2.5 khz. analog cosine wave F' at the output of DAC 26. By delaying or advancing the rising edges of signal E 103 as shown in FIG. 4(d)-(e), the phase of this analog cosine wave F' may be retarded or advanced. The numerical value of the data is unaffected, therefore this phase control is accomplished without affecting the ultimate amplitude of the analog signal F'.

The amount of advance or retard adjustment is limited by the time that the digital word is available at latch 18 before being "overwritten" by the next word. Accordingly, in this embodiment the advance or retard is limited to 0.8μs. This is sufficient to correct for anticipated "open loop" phase errors.

Referring still to FIG. 1, the staircase analog cosine wave F' produced by the DAC 26 is filtered by low-pass filter 30 which serves to remove the "staircase" effects, or quantization noise occurring at 625 khz and above. The low-pass-filter 30 removes these harmonic components to produce a low distortion cosine excitation signal F which is then amplified by power amplifier 34 for use by the resolver (not shown). The roll-off frequency of the low-pass filter 30 is selected to be approximately 28 khz, a much lower frequency than the 625 khz frequency of the quantization noise. The level of the roll-off frequency helps reduce distortion in the excitation signals caused by "linearity errors" in the DAC.

The low-pass filter 30, however, with its selected roll-off frequency, tends to introduce a phase error in the sinusoidal excitation signals. With the particular filter 30 and circuit in this example, there is a 19-degree phase lag shift in the sinusoidal excitation signals.

To compensate for this phase difference, both a coarse adjustment and a fine adjustment are made. The waveform data for the sine function and cosine function in the EPROM 12 are shifted by 19 degrees to provide a coarse adjustment for the 19-degree phase lag. The fine adjustment is made with the circuitry to be described below. This fine adjustment is on the order of one-half of one degree of phase arc in either the positive or negative sense. The overall circuit then provides resolution of phase differences with ± 2.7 minutes (a minute being 1/60 of a degree) of phase arc.

Figure 2:
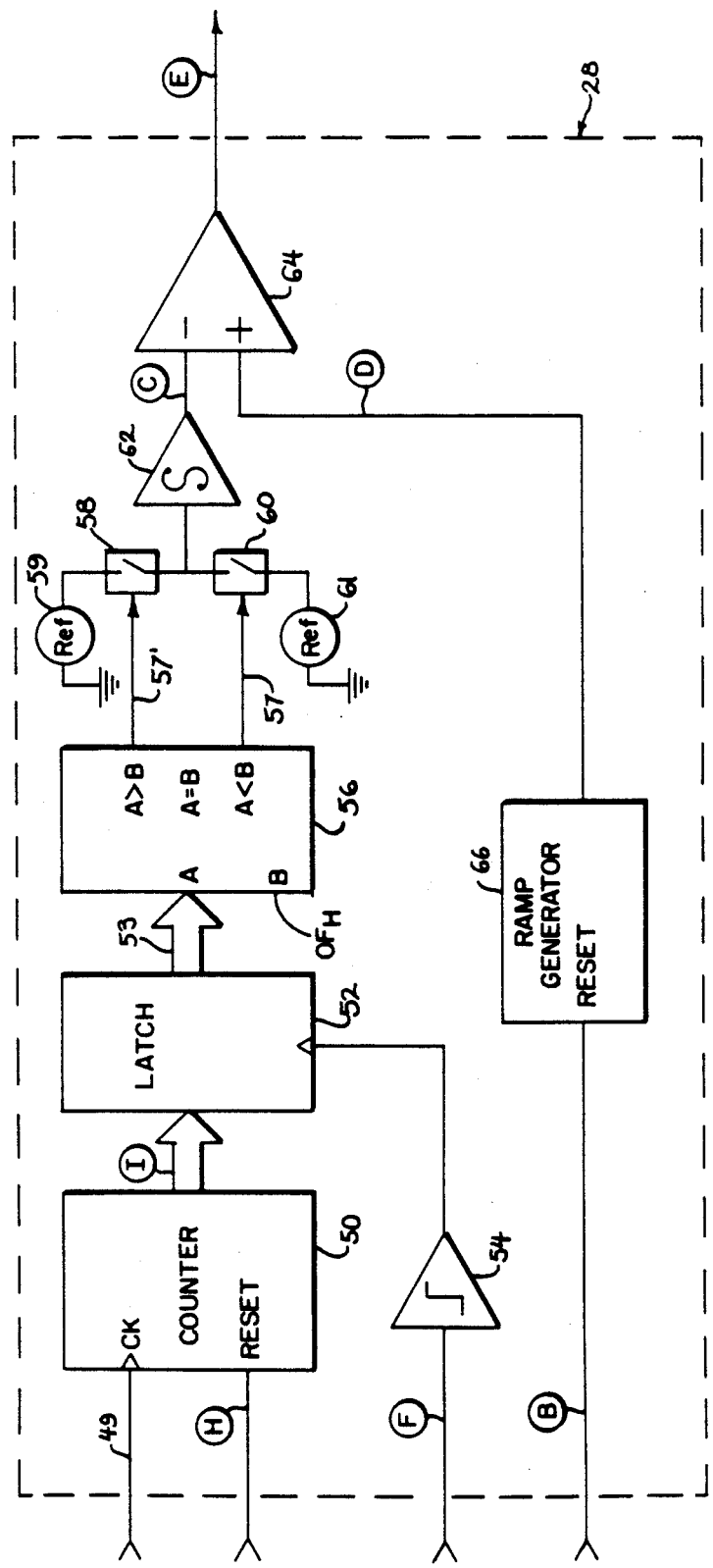
FIG. 2 is a detailed block diagram of the closed loop phase control circuit shown in FIG. 1.
Figure 5A:
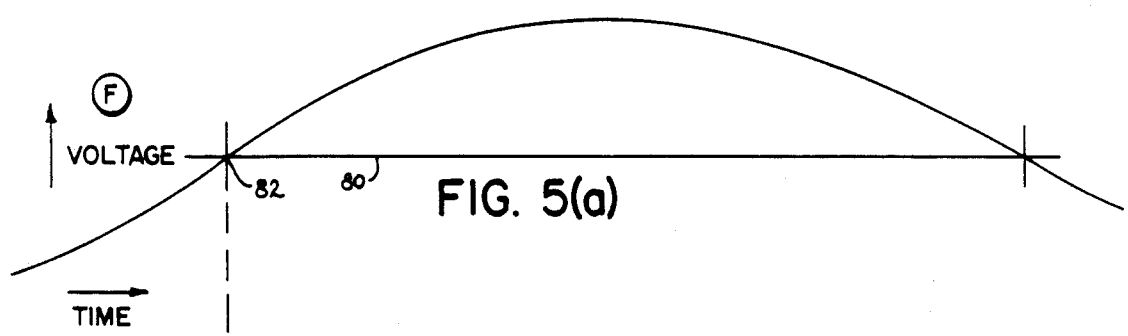
FIGS. 5(a)–5(d) are charts showing the timing relationships between the zero crossings of the sine and cosine signals produced by the circuit of FIG. 1 and certain other signals generated in the circuit of FIG. 1.
Figure 5B:
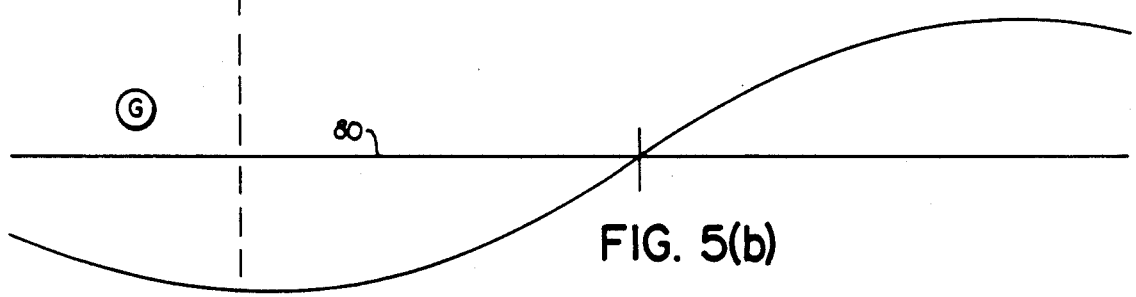

The operation of the cosine phase maintenance circuit will now be described. Referring to FIG. 6, a divide-by-125 output from address counter 10 produces a "counter start" signal H before the desired positive-going zero-crossing of the cosine excitation signal F, as shown in FIG. 5(a) and (c). This signal H serves as a digital timing reference with respect to which the phase of the cosine excitation signal will be adjusted. A 20 Mhz. clock signal 49 is also taken from the output of the divide-by-two counter 121. Referring to FIG. 2, an elapsed time counter 50 is clocked by this 20 Mhz clock signal 49 when enabled by a positive voltage or logical "one" from counter start signal H.

Figure 5C:
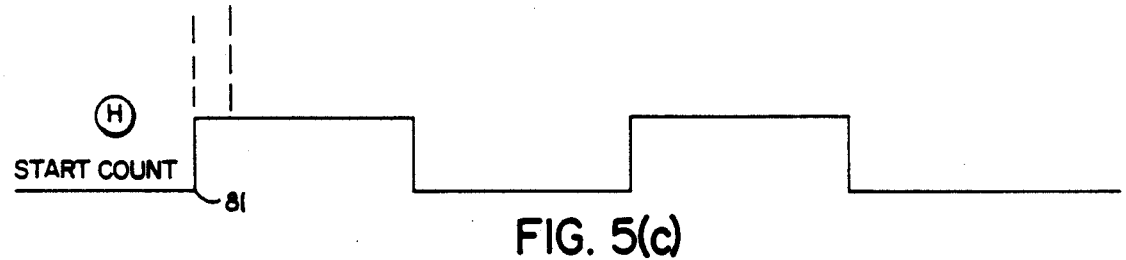
Figure 5D:
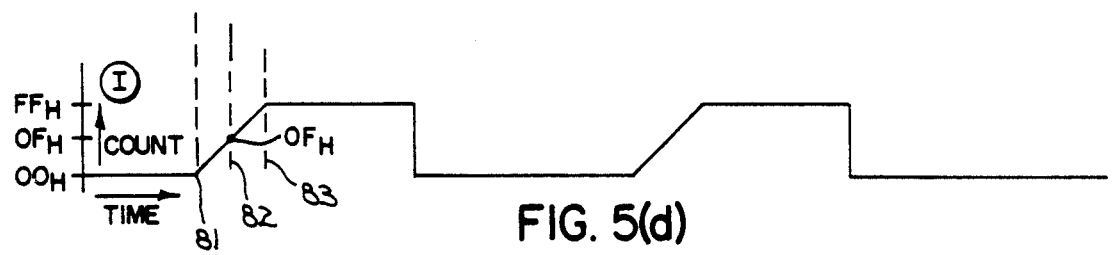

The cosine excitation signal F is connected to a high speed zero-crossing detector 54 which produces a logical one at the instant of signal F's positive-going zero-crossing causing latch 52 to capture the elapsed time at the output of counter 50, at the moment of waveform F's crossing of the zero threshold. FIG. 5(d) shows a conceptual representation of the output of counter 50, the vertical axis representing the elapsed time value of the counter 50. The count begins at time 81 as determined by the the counter start signal H shown in FIG. 5(c). At time 82, the cosine excitation signal F crosses through the zero voltage threshold level triggering the zero-crossing detector 54 to latch the output of the elapsed time counter 50, in this example approximately hexadecimal value 0F ($0F_H$). At time 83, the counter has reached its limit of $FF_H$, and holds that value until the end of the start count signal H.

Referring again to FIG. 2, latch 52 contains an elapsed time 53, i.e., the value of counter 50 at the time of the zero-crossing of waveform F. The elapsed time 53 is presented to magnitude comparator 56 which compares the elapsed time 53 in latch 52 to the value of $0F_H$.

Figure 3A:
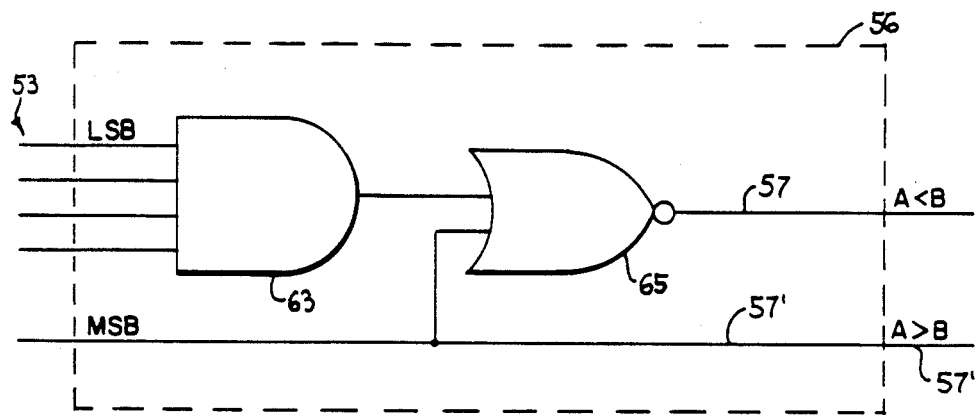
FIG. 3(a) is a detailed block diagram of the magnitude comparator circuit shown in FIG. 2.

The magnitude comparator 56 is comprised of an AND gate and a NOR gate and will now be described. Referring to FIG. 3(a), elapsed time signal 53, comprised of five bits of counter output from latch 52, is split. The four least significant bits are connected to the inputs of a quad input AND gate 63, while the most significant bit is connected to one input of a dual input NOR gate 65, and is the "A>B" output 57' of the magnitude comparator 56. The output of AND gate 63 is connected to the free input of the dual input NOR gate 65, and the output of that NOR gate 65 is the "A<B" output 57' of the magnitude comparator 56. As will be apparent to one skilled in the art, if the input to the magnitude comparator is of a hexadecimal value greater than $0F_H$, the "A>B" output will be at a logical "one". If the input to the magnitude comparator is of a hexadecimal value less than $0F_H$, the "A<B" will be at a logical "one". Further, if the input to the magnitude comparator is a hexadecimal value of $0F_H$ then neither output will be a logical "one". Together outputs 57 and 57' comprise a digital phase difference signal.

If the elapsed time 53 is greater than $0F_H$ then the magnitude comparator "A>B" output closes solid state switch 58 connecting voltage reference 59 to integrator 62 causing the voltage output C of integrator 62 to fall at approximately 6 µvolts per µs. If the count value from the latch 52 is less than $OF_H$ then the magnitude comparator "A<B" output closes solid state switch 60 connecting voltage reference 61 to integrator 62 causing the voltage output C of integrator 62 to rise at approximately 6 µvolts per µs. If the count value from the latch 52 is equal to $0F_H$ then neither switch 58 or 60 is closed and the integrator 62 output voltage is unaffected. Note that reference voltage 59 is established near 0 volts D.C., whereas reference voltage 61 is established to be a value near the maximum ramp voltage D. In this manner the integrator output E is confined to a voltage range which will ensure intersection with the ramp voltage "D". This is essential to ensure self starting and to avoid a lock-up condition. The magnitude comparator's output phase difference signal 53 thereby controls the voltage at integrator 62 to produce an analog phase correction voltage C.

Referring to FIG. 6, a decoder 124, attached to the output of the 4-bit counter 122 and the divide-by-two counter 126, produces a ramp start signal B which is connected to ramp generator 66 shown in FIG. 2. Referring to FIG. 4(b) the signal B resets the ramp waveform D produced by the ramp generator 66. The slope of the ramp waveform D thus generated is not critical but is selected to span the voltage range of the integrator 62 output during one period of the cosine latch signal A.

Referring again to FIG. 2, ramp waveform D and integrator output C are connected to high speed comparator 64 which produces a positive pulse E when ramp waveform D exceeds integrator output C. The resulting signal E is the cosine data clocking signal previously described.

Referring to FIG. 4(c) three example integrator output signals $C_1$ to $C_3$ are shown. $C_1$ represents the integrator output when the zero-crossing of the cosine excitation signal F occurs early i.e., before the counter 50 reaches $0F_H$ (before correction). $C_2$ represents the integrator output when the zero-crossing of the cosine excitation signal F occurs on time or in phase. $C_3$ represents the integrator output when the zero-crossing of the cosine excitation signal F occurs late i.e., after the counter 50 reaches $0F_H$.

Each of these integrator output signals $C_1$–$C_3$ intercept ramp waveform D at a different time after the rising edge of signal B, generating corresponding second cosine latch timing signals $E_1$–$E_3$ shown in FIG. 4(f).

In summary, if the phase of cosine excitation signal F, as indicated by its zero crossing, occurs early relative to the instant that counter 50 reaches count value $0F_H$, then the second cosine latch signal E is delayed per signal $E_1$ of FIG. 4(d). In operation, this delay will seek an equilibrium value so as to shift the phase of signal F so that the count of $0F_H$ is obtained thus achieving a desired phase set point. Conversely if the phase of signal F as indicated by its zero crossing occurs late relative to the instant that counter 50 reaches count value $OF_H$, then the second cosine latch signal E is advanced per signal $E_3$ of FIG. 4(f). This phase correcting feedback insures that the phase of signal F is precisely located with respect to the start count signal H and therefore synchronized generally with any digital timing reference signal derived from the 40 Mhz oscillator 120.

The operation of the amplitude control circuit will now be described. Again only the circuitry and processing applicable to the cosine data will be described. Identical processing and circuitry is applied to the sine data as will be apparent to one skilled in the art.

Figure 3B:
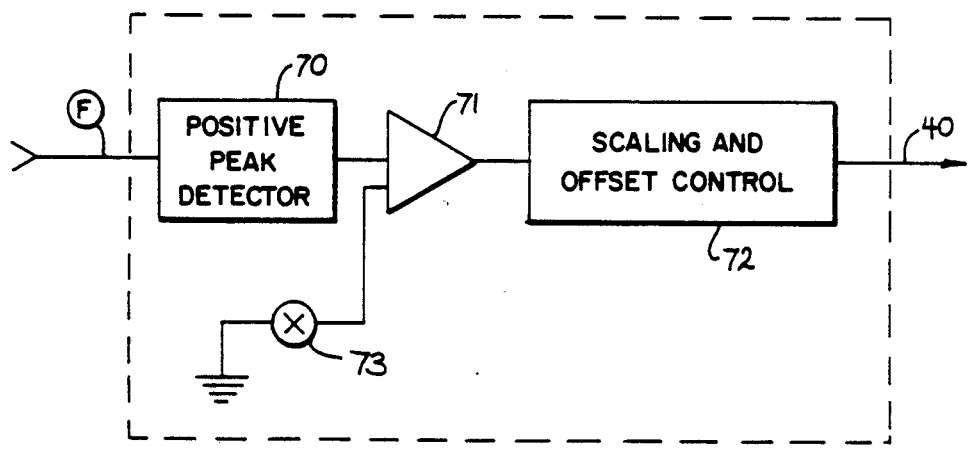
FIG. 3(b) is a detailed block diagram of the closed loop amplitude control circuit shown in FIG. 1.

Referring to FIG. 3, the cosine excitation signal F is monitored by a positive peak detector 70 with a time constant of approximately 0.1 second. The voltage output of the peak detector is representative of the amplitude of the filtered cosine wave F. This output voltage is fed to differential amplifier 71 which compares the amplitude of signal F to a precision D.C. reference 73 and produces a voltage error signal proportional in magnitude and polarity to the difference between the actual amplitude of signal F and the D.C. reference 73. This error signal is adjusted in scale and voltage offset, by scaling and offset control circuitry 72, and converted to a current output to bias the internal resistor ladder of DAC 26, shown in FIG. 1. As is understood by those skilled in the art, control of the ladder bias current of DAC 26 may control the effective gain of DAC 26 thereby scaling the amplitude of the analog staircase cosine waveform and ultimately the cosine excitation signal F. This control of the amplitude of cosine excitation signal F is independent of the previously described phase maintenance process.

Identical phase and amplitude control circuitry ensures that sine wave excitation signal G, shown in FIG. 1, is likewise precisely maintained at a predetermined phase with respect to the circuit timing signals derived from 40 Mhz clock 120, and hence that sine and cosine excitation signals F and G are precisely maintained at 90° phase with respect to each other.

A preferred embodiment of the invention has been described, but it should be apparent to those in the art that many variations can be made without departing from the spirit of the invention. For example, the frequency of the excitation sine and cosine waveforms may be altered as their phase relationship to each other and to the digital timing signals as may be required by a particular resolver. Further, the number of sine and cosine values stored in the EPROM and the accuracy in bits of those values may be varied depending on the resolution requirements of the system. Also, other phase or amplitude affecting networks may be included within the functional block of the low pass filter so as to achieve phase correction for the effects of these elements as well.

COMPONENT INDEX

| Reference Number | Model Number and Manufacturer | Description |
|---|---|---|
| 10 | 74HCT163, Signetics | 4-bit binary counter |
| 12 | 27C64 | 8K × 8 erasable programmable read only memory |
| 14,16,18,20,22 | 74HCT273, Signetics | edge triggered 8-bit D type latch |
| 24,26 | DAC-08HQ, Analog Devices | 8-bit digital-to-analog converter |
| 30,62 | TL082A, Texas Instruments | operational amplifier |
| 34,36 | LH010ACK, National Semiconductor | power operational amplifier |
| 50 | 74ALS 163, Signetics | 4-bit binary counter |
| 52 | 74ALS174, Signetics | 6-bit D type latch |
| 56 | 74HCT21/74HCT02 Signetics | and gate, nor gate network |
| 58,60 | DG 202CJ-4, Analog Devices | SPST analog switch |
| 64 | LM319, National Semiconductor | high speed comparator |

I claim:

1. A resolver excitation circuit for correcting phase difference between a digital timing reference signal and a sinusoidal excitation signal, the resolver excitation circuit comprising:
   memory means for storing words of waveform data as a sequence of digitized waveform values for the sinusoidal excitation signal;
   first latch means for sequentially receiving words of waveform data from the memory means, the first latch means storing one word of waveform data at one time;
   means for generating a plurality of addresses to the memory means to cause output of a plurality of the words of waveform data to the first latch means over a portion of one cycle of the sinusoidal excitation signal;
   digital-to-analog converter means responsive to waveform data received from the first latch means for converting the waveform data to an analog signal that controls sinusoidal excitation signal;
   means for generating a digital timing reference signal;
   phase difference detection means for detecting a phase difference between the sinusoidal excitation signals and the digital timing reference signal; and
   phase correction means for controlling the time of output of each word of waveform data from the first latch means to the digital-to-analog converter means in response to the detection of a phase difference by the phase detection means to correct the phase of the sinusoidal excitation signal.

2. The resolver excitation circuit of claim 1, wherein the phase difference detection means includes:
   means for generating timing signal synchronized to the digital timing reference signal;
   counter means responsive to the timing signals to accumulate an elapsed time count;
   a second latch means for receiving the elapsed time count;
   means responsive to the sinusoidal excitation signal crossing a zero threshold for generating a clock signal to the second latch means to enable the second latch means to receive and hold the elapsed time count; and
   means for receiving the elapsed time count from the output of the second latch means including means for comparing the elapsed time count with a predetermined count for the crossing of the zero threshold to generate a phase difference signal.

3. The resolver excitation circuit of claim 1 wherein the phase correcting means includes:
   variable voltage supply means responsive to the detection of a phase difference by the phase detection means to generate a phase correction voltage signal;
   means for generating a ramp signal synchronized to the digital timing reference signal; and
   means for comparing the phase correction voltage signal to the ramp signal including means for generating a clock signal to the first latch means to control the time of output of a word of waveform data from the first latch means to the digital-to-analog converter means.

4. The resolver excitation circuit of claim 1 further including:
   voltage reference means for generating a constant voltage;
   amplitude detection means for detecting an amplitude difference between the sinusoidal excitation signal and the voltage reference;
   scaling mean s for scaling the analog signal;
   amplitude correction means for controlling the scaling means in response to detection of an amplitude difference by the amplitude detection means to correct the amplitude of the analog signal that controls the sinusoidal excitation signal.

5. A resolver excitation circuit for correcting phase differences between two sinusoidal excitation signals that differ in phase by approximately ninety degrees, the resolver excitation circuit comprising:
   memory means for storing waveform words as a sequence of digitized waveform values for the sinusoidal excitation signals;
   demultiplexer means for sequentially receiving and storing a word pair from the memory, each word of the pair associated with digitized waveform value for one of the sinusoidal excitation signals at a corresponding phase;
   first latch means for independently receiving each word of one word pair from the demultiplexer means,
   means for generating a plurality of addresses to the memory to cause output of a plurality of the word pairs of waveform data to the demultiplexer means over a portion of corresponding cycles of each the sinusoidal excitation signals;
   digital-to-analog converter means independently responsive to each word of the word pair received from the first latch means for converting the word pairs into two analog signals that control the sinusoidal excitation signals associated with each word;

means for generating a digital timing reference signal;

phase difference detection means for detecting a phase difference between each of the sinusoidal excitation signals and the digital timing reference signal; and phase correction means for independently controlling the time of output of each word of the word pair from the first latch means to the digital-to-analog converter means in response to the detection of a phase difference by the phase detection means to correct the phase of the sinusoidal excitation signals.

* * * * *